(12) United States Patent
Chen et al.

(10) Patent No.: US 10,853,722 B2
(45) Date of Patent: Dec. 1, 2020

(54) APPARATUS FOR EXECUTING LSTM NEURAL NETWORK OPERATION, AND OPERATIONAL METHOD

(71) Applicant: Shanghai Cambricon Information Technology Co., Ltd., Pudong New Area (CN)

(72) Inventors: Yunji Chen, Pudong New Area (CN); Xiaobing Chen, Pudong New Area (CN); Shaoli Liu, Pudong New Area (CN); Tianshi Chen, Pudong New Area (CN)

(73) Assignee: Sanghai Cambricon Information Technology Co., Ltd., Pudong New Area (CN)

( * ) Notice: Subject to any disclaimer, the term of this patent is extended or adjusted under 35 U.S.C. 154(b) by 0 days.

(21) Appl. No.: 16/459,549

(22) Filed: Jul. 1, 2019

(65) Prior Publication Data

US 2019/0325298 A1 Oct. 24, 2019

Related U.S. Application Data

(63) Continuation-in-part of application No. PCT/CN2016/113493, filed on Dec. 30, 2016.

(30) Foreign Application Priority Data

Dec. 30, 2016 (CN) .......................... 2016 1 1269665

(51) Int. Cl.
*G06N 3/063* (2006.01)
*G06F 17/16* (2006.01)

(52) U.S. Cl.
CPC ............. *G06N 3/063* (2013.01); *G06F 17/16* (2013.01)

(58) Field of Classification Search
CPC ................................ G06N 3/063; G06F 17/16
See application file for complete search history.

(56) References Cited

U.S. PATENT DOCUMENTS

| 9,601,997 | B2 * | 3/2017 | Yan | ....................... | H02M 3/157 |
| 2001/0051967 | A1 * | 12/2001 | Jaber | .................... | G06F 17/142 |
| | | | | | 708/403 |

(Continued)

FOREIGN PATENT DOCUMENTS

CN 105184366 A 12/2015

OTHER PUBLICATIONS

José Pedro Castro Fonseca, "FPGA implementation of a LSTM Neural Network", Jul. 25, 2016, 1-69 (Year: 2016).*

(Continued)

*Primary Examiner* — Vincent Gonzales
*Assistant Examiner* — Imad Kassim
(74) *Attorney, Agent, or Firm* — Getech Law LLC; Jun Ye

(57) ABSTRACT

Aspects of processing data for Long Short-Term Memory (LSTM) neural networks are described herein. The aspects may include one or more data buffer units configured to store previous output data at a previous timepoint, input data at a current timepoint, one or more weight values, and one more bias values. The aspects may further include multiple data processing units configured to parallelly calculate a portion of an output value at the current timepoint based on the previous output data at the previous timepoint, the input data at the current timepoint, the one or more weight values, and the one or more bias values.

16 Claims, 5 Drawing Sheets

(56) References Cited

U.S. PATENT DOCUMENTS

| | | | | |
|---|---|---|---|---|
| 2002/0136280 | A1* | 9/2002 | Kido | H04B 1/7093 375/150 |
| 2007/0262827 | A1* | 11/2007 | Walkington | H03C 3/406 332/150 |
| 2008/0129379 | A1* | 6/2008 | Copeland | H03F 1/3241 330/149 |
| 2008/0130788 | A1* | 6/2008 | Copeland | H03F 1/3247 375/297 |
| 2017/0103305 | A1* | 4/2017 | Henry | G06N 3/063 |
| 2018/0121796 | A1* | 5/2018 | Deisher | G06N 3/063 |
| 2018/0174036 | A1* | 6/2018 | Han | G06N 3/082 |

OTHER PUBLICATIONS

Chen, et al., "A Small-Footprint Accelerator for Large-Scale Neural Networks", ACM Transactions on Computer Systems, vol. 33, No. 2, Article 6, May 2015, 27 pages.

Du, et al., "An Accelerator for High Efficient Vision Processing", IEEE Transactions on Computer-aided Design of Integrated Circuits and System, vol. 36, No. 2, Feb. 2017, pp. 227-240.

Liu, et al., "Cambricon: An Instruction Set Architecture for Neural Networks", 2016 ACM/IEEE 43rd Annual International Symposium on Computer Architecture, Oct. 12, 2016, pp. 393-405.

Zhang, et al., "Cambricon-X An Accelerator for Sparse Neural Networks", The 49th Annual IEEE/ACM International Symposium on Microarchitecture Article No. 20, Oct. 15, 2016, 12 pages.

Chen, et al., "DaDianNao: A Machine-Learning Supercomputer", 2014 47th Annual IEEE/ACM International Symposium on Microarchitecture, Dec. 13, 2014, pp. 609-622.

Luo, et al., "DaDianNao: A Neural Network Supercomputer", IEEE Transaction on Computers, vol. 66, No. 1, Jan. 2017, pp. 73-88.

Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.

Chen, et al., "DianNao Family: Energy-Efficient Hardware Accelerators for Machine Learning", Communications of he ACM, vol. 59, No. 11, Nov. 2016, pp. 105-112.

Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.

Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.

PCT/CN2016/113493—International Search Report, dated Oct. 11, 2017, 9 pages. (no English translation).

* cited by examiner

300

302 — An IO instruction is stored at the starting address of the instruction buffer unit 102 in advance

304 — The controller unit 103 reads the IO instruction from the starting address of the instruction buffer unit 102, and according to the decoded microinstructions, the direct memory access unit 101 reads all instructions related to the LSTM network calculations from the external address space and has them buffered into the instruction buffer unit 102

306 — The controller unit 103 reads an IO instruction from the instruction buffer unit 102; according to the decoded microinstructions, the direct memory access unit 101 reads from the designated external address space the weights and biases related to the LSTM network operations, including the weights and biases of the input gate, the output gate, the forget gate, and the candidate state cell, and the weights and biases are divided and read into different data buffer modules 4 according to different neurons corresponding to the weights

308 — The controller unit 103 reads a state cell initialization instruction from the instruction buffer unit 102, initializes the value of the state cell in the data buffer module 4 according to the decoded microinstructions, and sets the partial sums for the input gate, the output gate, the forget gate, and the candidate state cell to the corresponding neuron bias values

310 — The controller unit 103 reads an IO instruction from the instruction buffer unit 102; according to the decoded microinstructions, the direct memory access unit 101 reads the input values from the designated external address space into the data buffer units 4; each data buffer unit 104 receives the same input value vector

312 — The controller unit 103 reads a data processing instruction from the instruction buffer unit 102; according to the decoded microinstructions, the data processing module 105 acquires the relevant data required for the operation from the corresponding data buffer unit 104 for operations, the operation results are the output values of a part of the neurons corresponding to one time point, and the output values obtained from all the data processing modules 5, after combination, correspond to an output value for the one time point.

314 — The controller unit 103 reads an IO instruction from the instruction buffer unit 102; according to the decoded microinstructions, the output values in the data buffer unit 104 are spliced together and outputted to the designated external address through the direct memory access unit 101

316 — The controller unit 103 reads a determination instruction from the instruction buffer unit 102; according to the decoded microinstructions, the controller unit 103 decides whether the current forward process is completed, and if the current forward process is completed, the operation ends

Fig. 3

APPARATUS FOR EXECUTING LSTM NEURAL NETWORK OPERATION, AND OPERATIONAL METHOD

BACKGROUND

Artificial Neural Networks (ANNs), or Neural Networks (NNs) for short, is algorithmic mathematical models imitating the behavior characteristics of animal neural networks and performing the distributed concurrent information processing. Depending on the complexity of a system, such networks adjust interconnection among a great number of internal nodes, thereby achieving the purpose of information processing. The algorithm used by NNs may be vector multiplication (also referred to as "multiplication") and convolution, which widely adopts sign functions and various approximations thereof.

Long Short-Term Memory (LSTM) neural networks are time recursive neural networks (RNN). LSTM neural network may be suitable for processing and predicting important events with very long intervals and delays in time series due to a unique structural design of the network itself. LSTM networks may show better performances than traditional recursive neural networks, as it is suitable for learning from experiences so as to classify, process, and predict time series after a time of unknown length between important events. At present, LSTM networks are widely used in many fields such as speech recognition, video description, machine translation, and automatic music synthesis. At the same time, with the research on the LSTM network, the performance of LSTM networks has been greatly improved, and it has attracted extensive attention in industrial and academia communities.

The operation of LSTM networks involves a variety of algorithms, and its specific implementation devices mainly include the following two types:

One device that implements LSTM network operations may be a general-purpose processor. This method supports the above algorithms by executing general-purpose instructions using a general-purpose register stack and general functional means. One of the disadvantages of this method is that the performance of a single general-purpose processor is relatively low and cannot be accelerated by means of the normal parallelism of the LSTM network operations per se. While this method is executed by a plurality of general-purpose processors in parallel, mutual communication among these processors becomes a performance bottleneck. In addition, the general-purpose processors need to decode artificial neural network operations into a series of operations and memory access instructions, and the processor's front-end decoding also has large power consumption overhead.

Another known method of supporting LSTM network operations may be to use a graphics processing unit (GPU). The method performs the above algorithms by executing generic SIMD instructions using a general-purpose register stack and a general-purpose stream processing unit. Since GPU is an apparatus specifically designed to execute graphic and image operations and scientific computations, it does not provide dedicated support for the LSTM network, and a large amount of front-end decoding is still required to perform LSTM network operations, which would bring a lot of extra overhead. In addition, the GPU has only a small on-chip buffer, and relevant parameters used in the LSTM network need to be repeatedly transferred from outside of the chip, thus the off-chip bandwidth becomes a performance bottleneck as well.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example LSTM neural network processor. The example LSTM neural network processor may include one or more data buffer units configured to store previous output data at a previous timepoint, input data at a current timepoint, one or more weight values, and one more bias values. Further, the example LSTM neural network processor may include multiple data processing units configured to parallelly calculate a portion of an output value at the current timepoint based on the previous output data at the previous timepoint, the input data at the current timepoint, the one or more weight values, and the one or more bias values.

Another example aspect of the present disclosure provides an example method for LSTM neural networks. The example method may include storing, by one or more data buffer units, previous output data at a previous timepoint, input data at a current timepoint, one or more weight values, and one more bias values. Further, the example method may include parallelly calculating, by multiple data processing units, a portion of an output value at the current timepoint based on the previous output data at the previous timepoint, the input data at the current timepoint, the one or more weight values, and the one or more bias values To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3 illustrates a flow chart of an example process for processing data in an LSTM neural network;

DETAILED DESCRIPTION

Figure 1:
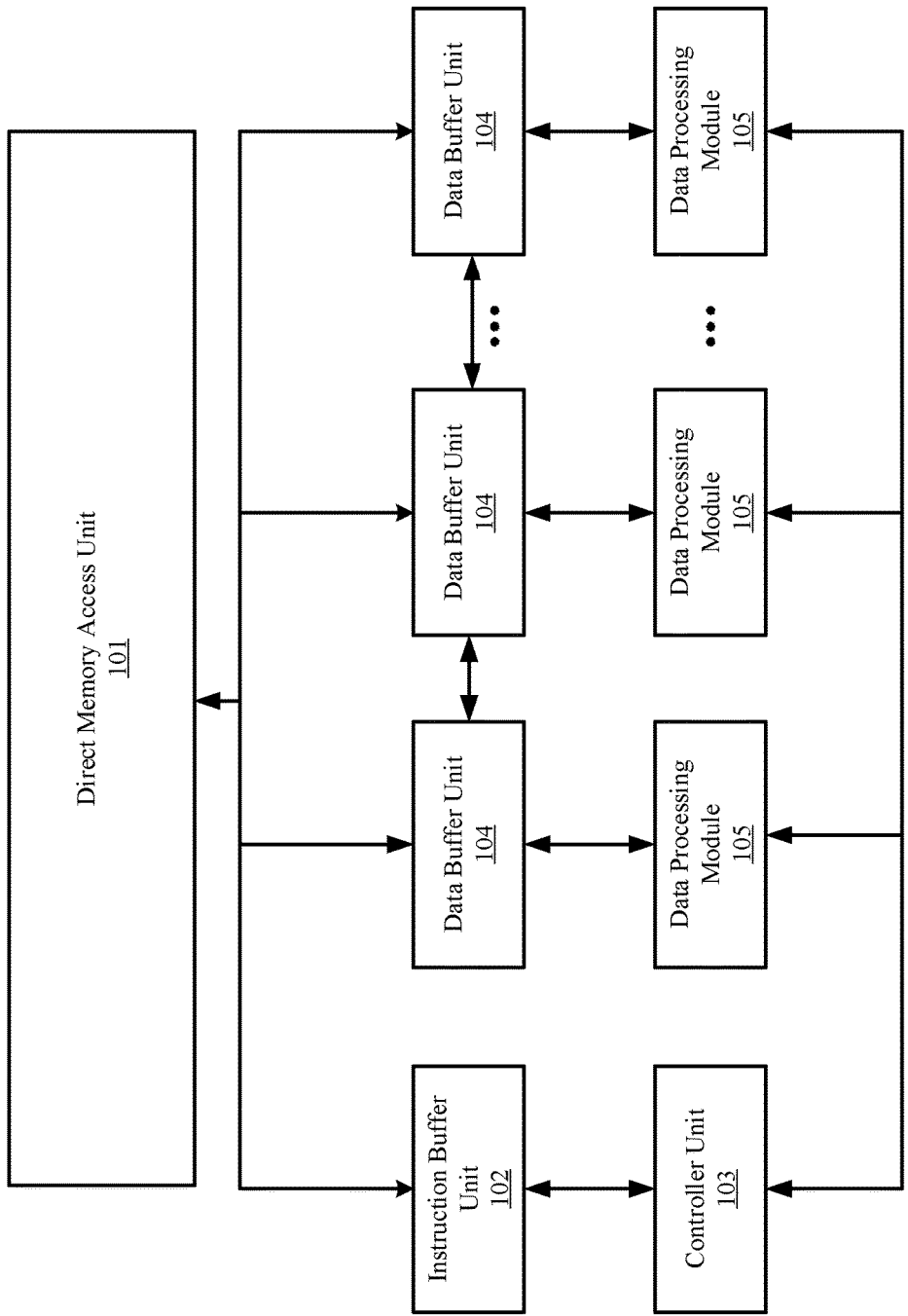
FIG. 1 illustrates an example LSTM neural network processor configured to parallelly process neural network data.

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Conventional methods for processing LSTM data may involve reading and writing large amounts of data from and to off-chip storages and, thus, may lead to high bandwidth requirements and reduce the performance of the entire system. Since weight values and bias values in an LSTM neural network may be repeatedly used for calculating results at different stages of the process, the needs to access off-chip storages may be lowered if the weight values and bias values may be stored on on-chip data buffer units.

In addition, multiple data processing units configured to parallelly process the data may further increase the overall performance of the entire system. The present disclosure may include some further technological improvements based on the practical applications described below in accordance with FIGS. 1-4.

First, by using external instructions for operation, the number of instructions required for operation is greatly reduced compared to existing implementations, such that the decoding overhead incurred when performing LSTM network operations is reduced;

Second, as weights and biases for hidden layers will be reused during the LSTM network operations, weight and bias values are temporarily stored in the data buffer unit, such that the IO amount between the device and outside is reduced, and the overhead for data transmission is reduced accordingly;

Third, the present disclosure is not limited to the application field of a specific LSTM network, but can be used in such fields as speech recognition, text translation, and music synthesis for its strong scalability;

Fourth, the plurality of data processing modules in the device are completely parallel, and the internal components of the data processing module are partially parallel, which can make full use of parallelism of the LSTM network, and significantly improve the operation speed of the LSTM network;

Fifth, the specific implementation of the vector nonlinear function transformer can be performed by a table lookup method, and its efficiency is greatly improved compared to the conventional function operations.

The device for performing LSTM network operations in the present disclosure can be applied to the following scenarios, including but not limited to: various electronic products such as data processing, robot, computer, printer, scanner, telephone, tablet, smart terminal, mobile phone, driving recorder, navigator, sensor, webcam, cloud server, camera, video camera, projector, watch, headset, mobile storage, and wearable apparatus; various transportations such as aircraft, ship, and vehicle; various household appliances such as television set, air conditioner, microwave oven, refrigerator, rice cooker, humidifier, washing machine, electric light, gas stove, and kitchen ventilator, as well as various medical equipment such as nuclear magnetic resonance imaging, B-ultrasound, and electrocardiograph.

FIG. 1 illustrates an example LSTM neural network processor 100 configured to parallelly process neural network data. As shown in FIG. 1, the example LSTM neural network processor 100 may include a direct memory access unit 101, an instruction buffer unit 102, a controller unit 103, a data buffer unit 104, and a data processing module 105, all of which can be implemented by hardware circuits.

The direct memory access unit 101 may be configured to access an external address space, read/write data from/to each of the buffer units inside the device, and complete the loading and storage of data, which may include reading an instruction from the instruction buffer unit 102, reading weights, biases, and input data required for LSTM network operations from designated storage units to the data buffer unit 104, and directly writing a post-operation output to the designated external space from the data buffer unit 104.

The instruction buffer unit 102 may be configured to read the instruction through the direct memory access unit 101 and buffer the read instructions.

The controller unit 103 may be configured to an instruction from the instruction buffer unit 102, decode the instruction into microinstructions that control behaviors of other modules and send them to other modules such as the direct memory access unit 101, the data buffer unit 104, and the data processing module 105.

The data buffer unit 104 may be configured to initialize a state cell of the LSTM at the time of device initialization, and read weights and biases from a designated external address through the direct memory access unit 101, the weights and biases read in each data buffer unit 104 correspond to the neuron to be calculated, that is, the weights and biases read in each data buffer unit 104 are part of the total weights and biases, and the weights and biases in all data buffer units 4, after combination, are the weights and biases read from the designated external address. In some examples, an input data is first obtained from the direct memory access unit 101, with each data buffer unit 104 obtaining a copy of the input data, and a partial sum being initialized to a bias value; and then a part of the weights, biases and input values may be sent to the data processing module 105. An intermediate value is calculated in the data processing module 105, which then is read from the data processing module 105 and saved into the data buffer unit 104. When all the inputs have been subjected to the operations once, the partial sum is input to the data processing module 105 to calculate a neuron output, which is then written back to the data buffer unit 104, and finally vector values of an input gate, an output gate, a forget gate and a candidate state cell are obtained. Then, the forget gate and the old state cell are sent to the data processing module 105 to calculate a partial sum and write it back to the data buffer unit 104; the candidate state cell and the input gate are sent to the data processing module 105 to calculate another partial sum; the partial sum in the data buffer unit 104 is written into the data processing module 105 and is subjected to a vector addition with the previously calculated partial sum to obtain the updated state cell, and the updated state cell is written back to the data buffer unit 104. The output gate is sent to the data processing module 105 and subjected to a vector point-multiplication with the transformed value by a nonlinear transformation function tan h of the updated state cell to obtain an output value, and the output value is written back to the data buffer unit 104. Finally, the corresponding updated state cell and the output value are obtained in each of the data buffer units 4, and the output values in all the data buffer units 104 are combined to be the final output value. Finally, each data buffer unit 104 writes the obtained final output value back to the designated external address space through the direct memory access unit 101.

The corresponding operations in LSTM network are as follows:

$f_t = \sigma(W_f[h_{t-1}, x_t] + b_f);$ $i_t = \sigma(W_i[h_{1-1}, x_t] + b_i);$ $\tilde{c}_t = \tan h(W_c[h_{t-1}, x_t] + b_c);$ $c_t = c_{t-1} \odot f_t + \tilde{c}_t \odot i_t;$ $o_t = \sigma(W_o[h_{t-1}, x_t] + b_o);$ $h_t = o_t \odot \tan h(c_t);$ in which, $x_t$ is the input data at a timing t, $h_{t-1}$ represents the output data at a timing t−1; $W_f$, $W_i$, $W_c$, and $W_o$ represent the weight vectors corresponding to the forget gate, the input gate, the updated state cell, and the output gate respectively; $b_f$, $b_i$, $b_c$, and $b_o$ represent the biases corresponding to the forget gate, the input gate, the updated state cell, and the output gate respectively; $f_t$ represents the output of the forget gate, which is subjected to a point-multiplication with the state cell at the timing t−1 to selectively forget values of past state cells; $i_t$ represents the output of the input gate, which is subjected to a point-multiplication with the candidate state value at the timing t to selectively add the candidate state value at the timing t into the state cell; $\tilde{c}_t$ represents the candidate state value calculated at the timing t; $c_t$ represents a new state value obtained by selectively forgetting the state value at the timing t−1 and selectively adding the state value at the timing t, which will be used at the timing of the final output calculation and transmitted to the next timing; $o_t$ represents a selection condition which needs to be output as a resulted part by the state cell at the timing t; $h_t$ represents the output at the timing t, which is also sent to the next timing at the same time; ⊙ is a product of vectors by elements; σ is a sigmoid function, with a formula of $$\sigma(x) = \frac{1}{1 - e^{-x}};$$

and the formula of the activation function tan h is $$\tanh(x) = \frac{e^x - e^{-x}}{e^x + e^{-x}}.$$

The data processing module 105 each time reads part of the weights $W_i/W_f/W_o/W_c$ and biases $b_i/b_f/b_o/b_c$ as well as the corresponding input data $[h_{t-1}, x_t]$ from the corresponding data buffer unit 104, completes a calculation on the partial sum by the dot product processors and the vector summation processors in the data processing module 105, until all the input data of each neuron have been operated once, and a net activation amounts $net_i/net_f/net_o/net_c$ of the neuron can be obtained. Then the calculation of the output values are completed by vector nonlinear function transformations with a sigmoid or tan h function and the calculations on the input gate $i_t$, the forget gate $f_t$, the output gate $o_t$ and the candidate state cell $\tilde{c}_t$ are completed respectively in this way. Then, the point-multiplication of the old state cell and the forget gate, as well as that of the candidate state cell and the input gate, are calculated respectively by the dot product processors in the data processing module 105, and the two results are subjected to an operation by the vector adders to obtain a new state cell $c_t$. The newly obtained state cell is written back into the data buffer unit 104. The state cell in the data processing module 105 completes the transformation of the tan h function by the vector nonlinear function transformer, so as to obtain tan $h(c_t)$. In the calculation process, it can be completed by calculating the value of the tan h function or by a lookup table. Then, the output gate and the tan h nonlinear transformed vector of the state cell are subjected to the dot product processors to calculate the final neuron output value $h_t$. Finally, the neuron output value $h_t$ is written back to the data buffer unit 104.

Figure 2:
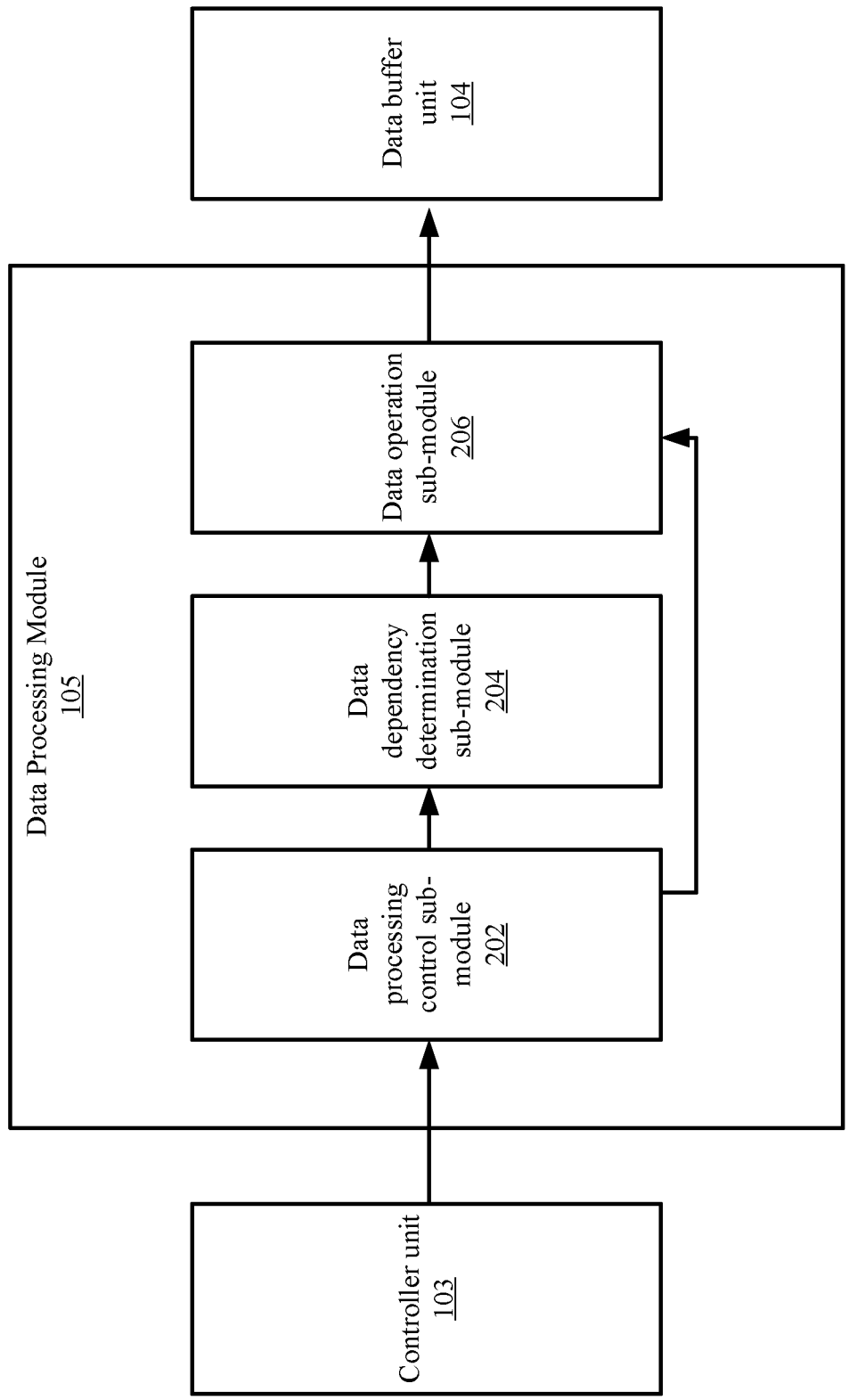
FIG. 2 illustrates an example data processing module in the example LSTM neural network processor.

FIG. 2 illustrates an example data processing module in the example LSTM neural network processor. As shown in FIG. 2, the data processing unit 5 includes a data processing control sub-module 202, a data dependency determination sub-module 204, and a data operation sub-module 206.

Wherein, the data processing control sub-module 202 controls the operations performed by the data operation sub-module 206 and controls the data dependency determination sub-module 204 to determine whether or not the current operation has a data dependency. For part of the operations, the data processing control sub-module 202 controls the operations performed by the data operation sub-module 206; and for operations that may have data dependencies, the data processing control sub-module 202 first controls the data dependency determination sub-module 204 to determine whether the current operation has a data dependency. If so, the data processing control sub-module 202 inserts a null operation into the data operation sub-module 206 until the data dependency is released, and then controls the data operation sub-module 206 to perform a data operation.

The data dependency determination sub-module 204 is controlled by the data processing control sub-module 202 to check whether there is a data dependency in the data operation sub-module 206. If the next operation requires a value that has not been operated yet, then there is currently a data dependency, otherwise, there is no data dependency. A method of data dependency detection is that, there are registers R1, R2, R3, R4, and R5 in the data operation sub-module 206, which are respectively used for indicating whether the input gate, the forget gate, the output gate, the candidate state cell and the tan h function transformation on the updated state cell are completed; a non-zero value of the register indicates that the operation is completed, and a zero indicates that the operation has not been completed. Corresponding to the LSTM network, the data dependency determination sub-module 204 determines the data dependency twice, i.e., determining whether there is data dependency among the input gate, the output gate and the candidate state cell when calculating the new state cell, and determining whether there is data dependency between the output gate and the tan h function transformation on the updated state cell when calculating the output value, respectively, by determining respectively whether R1, R2, and R4 are all non-zero and whether R3 and R5 are both non-zero. After the determination, the determination results need to be sent back to the data processing control sub-module 202.

The data operation sub-module 206 is controlled by the data processing control sub-module 202 to complete the data processing in the network operation procedure. The data operation sub-module 206 includes dot product processors, vector adders, vector summation processors, vector nonlinear transformer, and registers R1, R2, R3, R4, and R5 indicating whether or not the relevant data operations are completed. The registers R1, R2, R3, R4, and R5 are used for indicating whether the input gate, the forget gate, the output gate, the candidate state cell, and the tan h function transformation on the updated state cell are completed; a non-zero value of the register indicates that the operation is completed, and zero indicates that the operation has not been completed. Wherein, the vector adders add two vectors by their corresponding positions to obtain a vector, while the vector summation processors divide the vector into several segments, and perform an internal summation for each segment, with the finally resulted vector having a length equal to the number of segments. The vector nonlinear transformer takes each element in the vector as an input to obtain a nonlinear-function-transformed output. The specific nonlinear transformation can be done in two ways. Take the sigmoid function with an input x as an example, one method is to directly calculate sigmoid(x) by use of function operation; and the other method is to use a table lookup method, where the data operation sub-module 206 maintains a table of sigmoid functions which records values of outputs $y_1$, $y_2 \ldots y_n$ corresponding to inputs $x_1, x_2 \ldots x_n$ ($x_1 < x_2 < \ldots < x_n$), and to calculate the function values corresponding to x, an interval $[x_i, x_{i+1}]$ satisfying $x_i < x < x_{i+1}$ is firstly found, and $$\frac{y_{i+1} - y_i}{x_{i+1} - x_i}$$

$(x-x_i)+y_i$ is calculated as the output value. For the LSTM network operation procedure, the following operations are performed:

First, R1, R2, R3, R4, and R5 are set to zero. A partial sum of the input gate is initialized with a bias; a temporary value is obtained by the dot product processors from the partial sum of input data and the weight corresponding to the input data, then the temporary value is segmented according to vectors of the temporary values corresponding to different neurons, the summation on the temporary values is completed by the vector summation processors, and an update of the partial sum is completed with the calculation result and the input gate partial sum; take another set of input data and weight for the same operation to update the partial sum; after all the input data have been operated once, the resulting partial sum is the net activation amount of the neuron, and then the output value of the input gate is calculated by the vector nonlinear transformer. The output value is written back into the data buffer unit 104 and the register R1 is set to non-zero.

The output values of the forget gate, the output gate, and the candidate state cell are calculated by the same method as that for calculating the output of the input gate, the corresponding output values are written back into the data buffer unit 104, and the registers R2, R3, and R4 are set to non-zero.

A null operation or an operation on the updated state cell is performed according to the control commands of the data processing control sub-module 202. The operation on the updated state cell is: fetching the output value of the forget gate and an old state cell from the data buffer unit 104, calculating a partial sum by the dot product processors, then fetching the output value of the input gate and the candidate state cell from the data buffer unit 104, calculating a partial sum by the dot product processors, which then is subjected to the vector adders together with the previous partial sum of state cell to obtain the updated state cell. Finally, the last state cell is written back into the data buffer unit 104.

A null operation or an operation on the LSTM network output value is performed according to the control commands of the data processing control sub-module 202. The operation on the output value is: subjecting the updated state cell to the vector nonlinear function transformer to calculate the nonlinear transformed value of the state cell, and then the R5 is set to non-zero. Then, a point-multiplication is performed on the output gate and the nonlinear transformed value of the state cell by the dot product processors, and the final output value is calculated as the output value of the corresponding neuron in the LSTM network. The output value is written back into the data buffer unit 104.

The device of the present disclosure operates using a specially designed instruction set, and the efficiency of instruction decoding is relatively high. Parallel calculations among the plurality of data processing modules and parallel operations among the plurality of data buffer units do not require data transmission, which greatly improves the parallelism of these operations. In addition, putting weights and biases in the data buffer unit can reduce IO operations between the device and the external address space, which reduces the bandwidth required for memory access.

FIG. 3 illustrates a flow chart of an example process 300 for processing data in an LSTM neural network.

At block 302, an IO instruction is stored at the starting address of the instruction buffer unit 102 in advance.

At block 304, the controller unit 103 reads the IO instruction from the starting address of the instruction buffer unit 102, and according to the decoded microinstructions, the direct memory access unit 101 reads all instructions related to the LSTM network calculations from the external address space and has them buffered into the instruction buffer unit 102.

At block 306, the controller unit 103 reads an IO instruction from the instruction buffer unit 102; according to the decoded microinstructions, the direct memory access unit 101 reads from the designated external address space the weights and biases related to the LSTM network operations, including the weights and biases of the input gate, the output gate, the forget gate, and the candidate state cell, and the weights and biases are divided and read into different data buffer modules 4 according to different neurons corresponding to the weights.

At block 308, the controller unit 103 reads a state cell initialization instruction from the instruction buffer unit 102, initializes the value of the state cell in the data buffer module 4 according to the decoded microinstructions, and sets the partial sums for the input gate, the output gate, the forget gate, and the candidate state cell to the corresponding neuron bias values.

At block 310, the controller unit 103 reads an IO instruction from the instruction buffer unit 102; according to the decoded microinstructions, the direct memory access unit 101 reads the input values from the designated external address space into the data buffer units 4; each data buffer unit 104 receives the same input value vector.

At block 312, the controller unit 103 reads a data processing instruction from the instruction buffer unit 102; according to the decoded microinstructions, the data processing module 105 acquires the relevant data required for the operation from the corresponding data buffer unit 104 for operations, the operation results are the output values of a part of the neurons corresponding to one time point, and the output values obtained from all the data processing modules 5, after combination, corresponding to an output value for the one time point. Please refer to FIGS. 4A and 4B for the detailed processing procedure. After the processing is finished, the data processing module 105 stores the processed intermediate values or output values and the states cell values into the data buffer units 4.

At block 314, the controller unit 103 reads an IO instruction from the instruction buffer unit 102; according to the decoded microinstructions, the output values in the data buffer unit 104 are spliced together and outputted to the designated external address through the direct memory access unit 101.

At block 316, the controller unit 103 reads a determination instruction from the instruction buffer unit 102; according to the decoded microinstructions, the controller unit 103 decides whether the current forward process is completed, and if the current forward process is completed, the operation ends. If the current forward process is not completed, the flow proceeds to block 312 to continue.

Figure 4A:
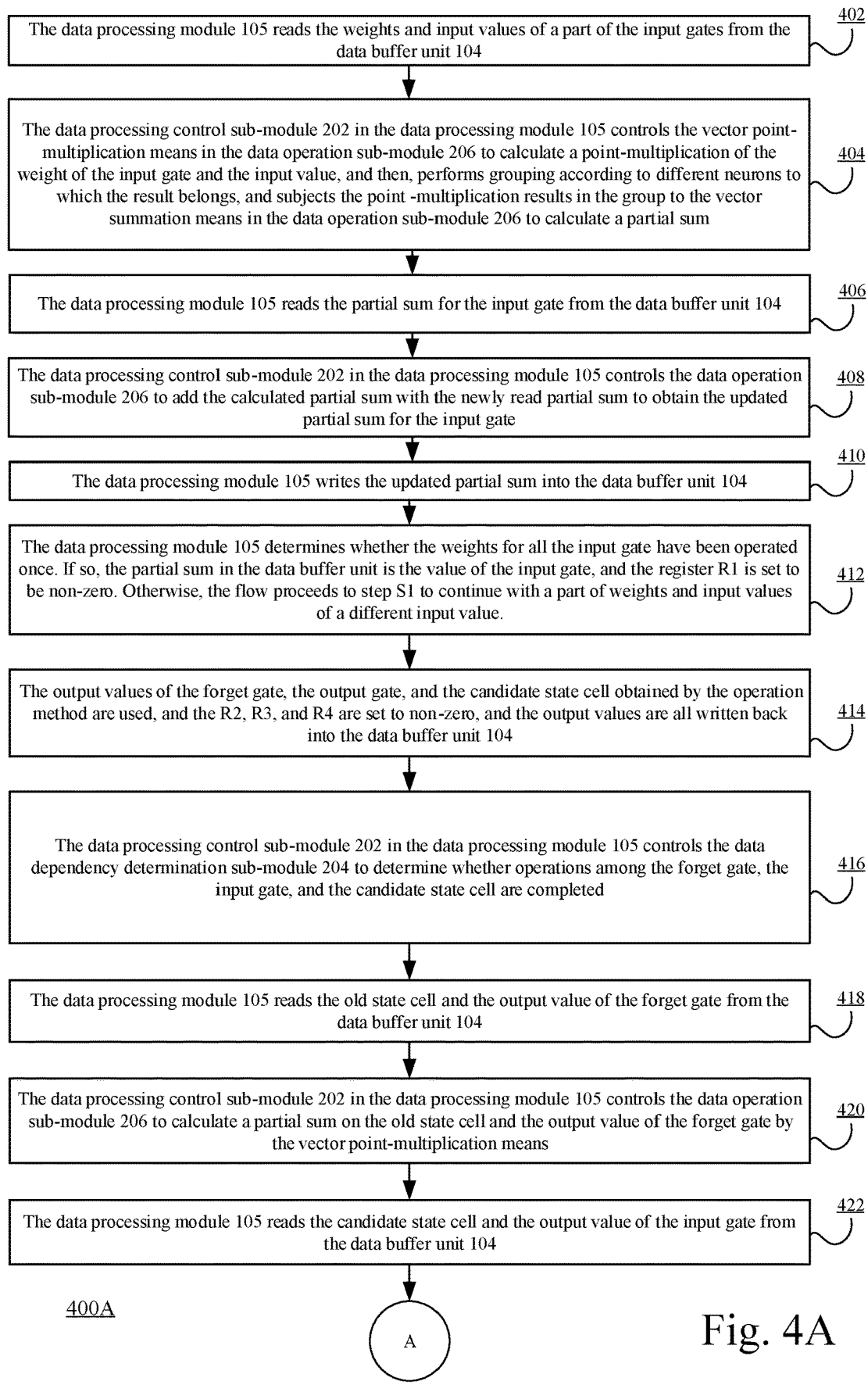
FIG. 4A illustrates a first portion of a flow chart of an example sub-process for processing data in the LSTM neural network.

FIG. 4A illustrates a first portion 400A of a flow chart of an example sub-process for processing data in the LSTM neural network. The example sub-process may be performed by the components described in FIGS. 1 and 2.

At block 402, the data processing module 105 reads the weights and input values of a part of the input gates from the data buffer unit 104.

At block 404, the data processing control sub-module 202 in the data processing module 105 controls the dot product processors in the data operation sub-module 206 to calculate a point-multiplication of the weight of the input gate and the input value, and then, performs grouping according to different neurons to which the result belongs, and subjects the point-multiplication results in the group to the vector summation processors in the data operation sub-module 206 to calculate a partial sum.

At block 406, the data processing module 105 reads the partial sum for the input gate from the data buffer unit 104.

At block 408, the data processing control sub-module 202 in the data processing module 105 controls the data operation sub-module 206 to add the calculated partial sum with the newly read partial sum to obtain the updated partial sum for the input gate.

At block 410, the data processing module 105 writes the updated partial sum into the data buffer unit 104.

At block 412, the data processing module 105 determines whether the weights for all the input gate have been operated once. If so, the partial sum in the data buffer unit is the value of the input gate, and the register R1 is set to be non-zero. Otherwise, the flow proceeds to step S1 to continue with a part of weights and input values of a different input value.

At block 414, the output values of the forget gate, the output gate, and the candidate state cell obtained by the operation method are used, and the R2, R3, and R4 are set to non-zero, and the output values are all written back into the data buffer unit 104.

At block 416, the data processing control sub-module 202 in the data processing module 105 controls the data dependency determination sub-module 204 to determine whether operations among the forget gate, the input gate, and the candidate state cell are completed, that is, whether R1, R2, and R4 are all non-zero. If no, the data processing control sub-module 202 controls the data operation sub-module 206 to perform a null operation, and then proceeds to step S8 to continue; if yes, the flow proceeds to step S9.

At block 418, the data processing module 105 reads the old state cell and the output value of the forget gate from the data buffer unit 104.

At block 420, the data processing control sub-module 202 in the data processing module 105 controls the data operation sub-module 206 to calculate a partial sum on the old state cell and the output value of the forget gate by the dot product processors.

At block 422, the data processing module 105 reads the candidate state cell and the output value of the input gate from the data buffer unit 104.

Figure 4B:
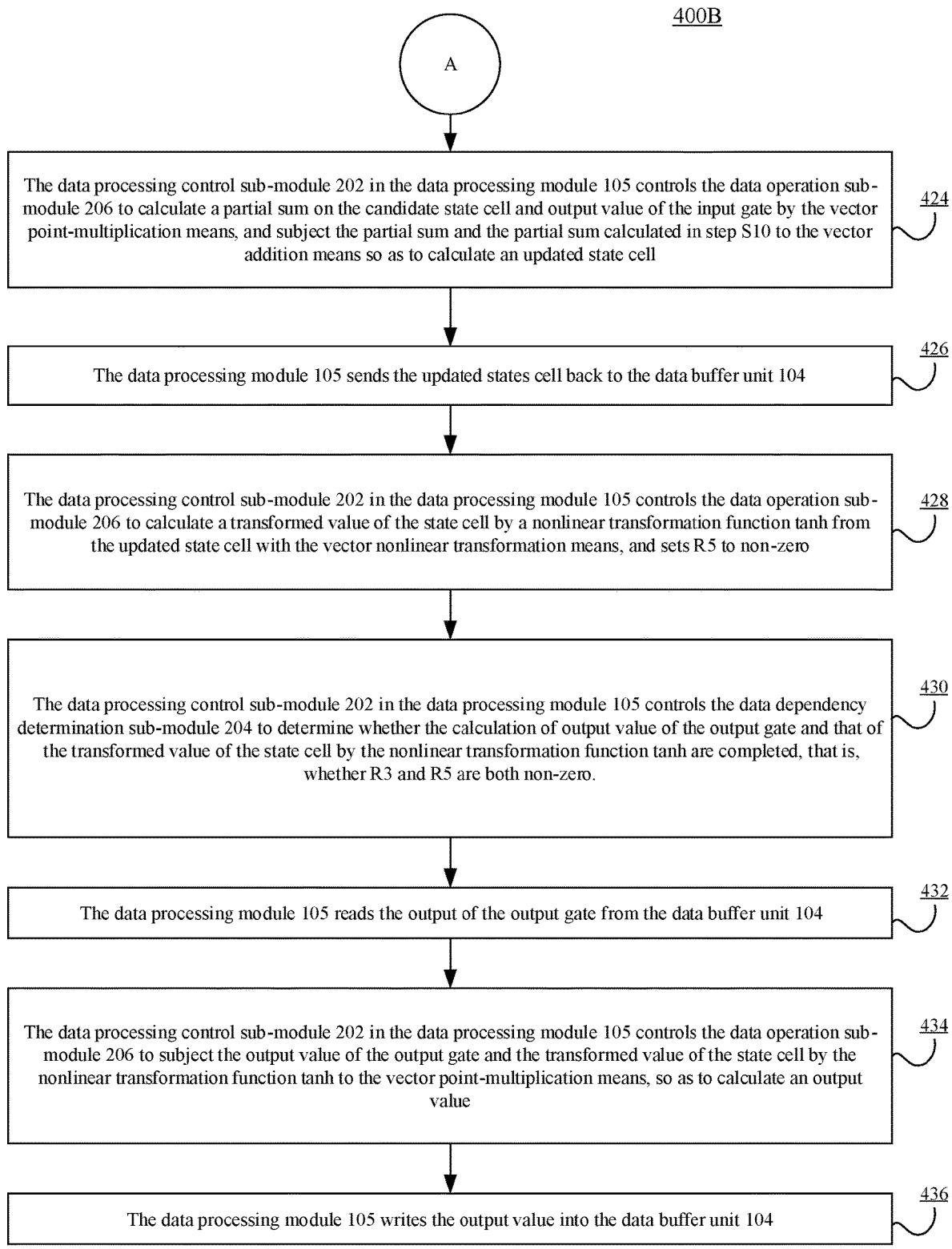
FIG. 4B illustrates a second portion of the flow chart of the example sub-process for processing data in the LSTM neural network.

FIG. 4B illustrates a second portion of the flow chart of the example sub-process for processing data in the LSTM neural network. The example sub-process may be performed by the components described in FIGS. 1 and 2.

At block 424, the data processing control sub-module 202 in the data processing module 105 controls the data operation sub-module 206 to calculate a partial sum on the candidate state cell and output value of the input gate by the dot product processors, and subject the partial sum and the partial sum calculated in step S10 to the vector adders so as to calculate an updated state cell.

At block 426, the data processing module 105 sends the updated states cell back to the data buffer unit 104.

At block 428, the data processing control sub-module 202 in the data processing module 105 controls the data operation sub-module 206 to calculate a transformed value of the state cell by a nonlinear transformation function tan h from the updated state cell with the vector nonlinear transformer and sets R5 to non-zero.

At block 430, the data processing control sub-module 202 in the data processing module 105 controls the data dependency determination sub-module 204 to determine whether the calculation of output value of the output gate and that of the transformed value of the state cell by the nonlinear transformation function tan h are completed, that is, whether R3 and R5 are both non-zero. If no, the data processing control sub-module 202 controls the data operation sub-module 206 to perform a null operation, then the flow proceeds to step S15 to continue; if yes, the flow proceeds to S16.

At block 432, the data processing module 105 reads the output of the output gate from the data buffer unit 104.

At block 434, the data processing control sub-module 202 in the data processing module 105 controls the data operation sub-module 206 to subject the output value of the output gate and the transformed value of the state cell by the nonlinear transformation function tan h to the dot product processors, so as to calculate an output value, i.e., the output value in the neuron in the LSTM network corresponding to the data processing module 105.

At block 436, the data processing module 105 writes the output value into the data buffer unit 104.

The processes or methods depicted in the foregoing drawings may be implemented by a processing logic including hardware (e.g., circuit, dedicated logic, etc.), firmware, software (e.g., software embodied in a non-transitory computer-readable medium), or combinations thereof. Although the processes or methods are described above in certain orders, it should be understood that some of the described operations can be performed in a different order. In addition, certain operations may be performed in parallel rather than sequentially.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A Long Short-Term Memory (LSTM) neural network processor, comprising:
    one or more on-chip data buffer circuits configured to store previous output data at a previous timepoint, input data at a current timepoint, one or more weight values, and one more bias values,
    wherein the weight values include:
        one or more forget gate weight values corresponding to a forget gate,
        one or more input gate weight values corresponding to an input gate,
        one or more candidate weight values corresponding to an updated state cell, and
        one or more output gate weight values corresponding to an output gate, and
    wherein the bias values include:
        one or more forget gate bias values corresponding to the forget gate,
        one or more input gate bias values corresponding to the input gate,
        one or more candidate bias values corresponding to the candidate state value, and
        one or more output gate bias values corresponding to the output gate; and
    multiple data processing circuits configured to calculate an output value at the current timepoint based on the previous output data at the previous timepoint, the input data at the current timepoint, the one or more weight values, and the one or more bias values,
        wherein each of the multiple data processing circuits is configured to parallelly calculate a portion of the output value,
        wherein the multiple data processing circuits are configured to combine the portions of the output value into the output value at the current timepoint,
        wherein each of the multiple data processing circuits are configured to parallelly calculate a portion of a forget gate output based on the previous output data at the previous timepoint, the input data at the current timepoint, and the one or more forget gate weight values, the one or more forget gate bias values,
        wherein each of the multiple data processing circuits are configured to parallelly calculate a portion of an input gate output based on the previous output data at the previous timepoint, the input data at the current timepoint, and the one or more input gate weight values, and the one or more input gate bias values,
        wherein each of the multiple data processing circuits are configured to parallelly calculate a portion of a candidate state value based on the previous output data at the previous timepoint, the input data at the current timepoint, and the one or more candidate weight values, and the one or more candidate bias values,
        wherein each of the multiple data processing circuits are configured to parallelly calculate a portion of an output gate value based on the previous output data at the previous timepoint, the input data at the current timepoint, and the one or more output gate weight values, and the one or more output gate bias values,
        wherein each of the multiple data processing circuits are configured to parallelly calculate the updated state cell at the current timepoint based on a previous state value at the previous timepoint, the candidate state value, the forget gate output, and the input gate output, and wherein each of the multiple data processing circuits are configured to parallelly calculate the portion of the output value based on the output gate value and the updated state cell.

2. The neural network processor of claim 1, wherein each of the multiple data processing circuits includes one or more dot product processor circuits, one or more vector adder circuits, and one or more vector summation processor circuits.

3. The neural network processor of claim 2, wherein the one or more dot product processor circuits, one or more vector adder circuits, and one or more vector summation processor circuits are configured to parallelly calculate the portion of the output value at the current timepoint.

4. The neural network processor of claim 1,
wherein each of the multiple data processing circuits includes a data processing control circuit, a data dependency determination circuit, and a data operation circuit,
wherein the data processing control circuit is configured to:
control one or more dot product processor circuits in the data operation circuit to calculate dot products between the one or more input data weight values and the input data,
divide the dot products into multiple groups based on correspondences between the dot products and different neurons,
wherein one or more vector summation processor circuits in the data operation circuit are configured to calculate a first partial sum based on the dot products,
wherein each of the multiple data processing circuits is configured to read a previously stored partial sum from one of the one or more on-chip data buffer circuits,
wherein the data operation circuit is configured to add the calculated first partial sum with the previously stored partial sum to generate an updated input gate partial sum,
wherein the data operation circuit is configured to write the updated input gate partial sum to the one of the one or more on-chip data buffer circuits, and
wherein the data dependency determination circuit is configured to:
determine whether all of the input gate weight values have been processed, and
set the input gate output as the updated input gate partial sum based on the determination that all of the input gate weight values have been processed.

5. The neural network processor of claim 4,
wherein each of the multiple data processing circuits is configured to read the previous state value at the previous timepoint and the forget gate output from the one or more on-chip data buffer circuits, and
wherein the data operation circuit is configured to calculate dot products between the previous state value at the previous time point to generate a second partial sum.

6. The neural network processor of claim 5,
wherein each of the multiple data processing circuits is configured to read the candidate state value and input gate output from the one or more on-chip data buffer circuits,
wherein the data operation circuit is configured to calculate dot products between the candidate state value and the input gate output to generate a third partial sum, and
wherein the data operation circuit is configured to add the second partial sum to the third partial sum to generate the updated state cell.

7. The neural network processor of claim 6,
wherein the data dependency determination circuit is configured to determine whether the output gate value and a tan h function of the updated state cell are calculated,
wherein each of the multiple data processing circuits is configured to read the output gate value from the one or more on-chip data buffer circuits.

8. The neural network processor of claim 7, wherein the data operation circuit is configured to calculate the portion of the output value by calculate dot products between the output gate value and the tan h function of the updated state cell.

9. A method for processing data for Long Short-Term Memory (LSTM) neural networks, comprising:
storing, by one or more on-chip data buffer circuits, previous output data at a previous timepoint, input data at a current timepoint, one or more weight values, and one more bias values,
wherein the weight values include:
one or more forget gate weight values corresponding to a forget gate,
one or more input gate weight values corresponding to an input gate,
one or more candidate weight values corresponding to an updated state cell, and
one or more output gate weight values corresponding to an output gate, and
wherein the bias values include:
one or more forget gate bias values corresponding to the forget gate,
one or more input gate bias values corresponding to the input gate,
one or more candidate bias values corresponding to the candidate state value, and
one or more output gate bias values corresponding to the output gate;
parallelly calculating, by each of multiple data processing circuits, a portion of an output value at the current timepoint based on the previous output data at the previous timepoint, the input data at the current timepoint, the one or more weight values, and the one or more bias values;
combining, by the multiple data processing circuits, the calculated portions of the output value into the output value at the current timepoint, and
parallelly calculating, by each of the multiple data processing circuits, a portion of a forget gate output based on the previous output data at the previous timepoint, the input data at the current timepoint, and the one or more forget gate weight values, the one or more forget gate bias values;
parallelly calculating, by each of the multiple data processing circuits, a portion of an input gate output based on the previous output data at the previous timepoint, the input data at the current timepoint, and the one or more input gate weight values, and the one or more input gate bias values;
parallelly calculating, by each of the multiple data processing circuits, a portion of a candidate state value based on the previous output data at the previous timepoint, the input data at the current timepoint, and the one or more candidate weight values, and the one or more candidate bias values;
parallelly calculating, by each of the multiple data processing circuits, a portion of an output gate value based on the previous output data at the previous timepoint, the input data at the current timepoint, and the one or more output gate weight values, and the one or more output gate bias values;

parallelly calculating, by each of the multiple data processing circuits, the updated state cell at the current timepoint based on a previous state value at the previous timepoint, the candidate state value, the forget gate output, and the input gate output; and parallelly calculating, by each of the multiple data processing circuits, the portion of the output value based on the output gate value and the updated state cell.

10. The method of claim 9, wherein each of the multiple data processing units includes one or more dot product processor circuits, one or more vector adder circuits, and one or more vector summation processor circuits.

11. The method of claim 10, further comprising parallelly calculating, by the one or more dot product processor circuits, one or more vector adder circuits, and one or more vector summation processor circuits, the portion of the output value at the current timepoint.

12. The method of claim 9, further comprising:

controlling, by a data processing control circuit of each of the multiple data processing circuits, one or more dot product processor circuits in a data operation circuit to calculate dot products between the one or more input data weight values and the input data;

dividing, by the data processing control circuit, the dot products into multiple groups based on correspondences between the dot products and different neurons;

calculating, by one or more vector summation processor circuits in the data operation circuit, a first partial sum based on the dot products;

reading, by each of the multiple data processing circuits, a previously stored partial sum from one of the one or more on-chip data buffer circuits;

adding, by the data operation circuit, the calculated first partial sum with the previously stored partial sum to generate an updated input gate partial sum;

writing, by the data operation circuit, the updated input gate partial sum to the one of the one or more on-chip data buffer circuits;

determining, by a data dependency determination circuit of each of the multiple data processing circuits, whether all of the input gate weight values have been processed; and setting, by the data dependency determination circuit, input gate output as the updated input gate partial sum based on the determination that all of the input gate weight values have been processed.

13. The method of claim 12, further comprising:

reading, by each of the multiple data processing circuits, the previous state value at the previous timepoint and the forget gate output from the one or more on-chip data buffer circuits; and calculating, by the data operation circuit, dot products between the previous state value at the previous time point to generate a second partial sum.

14. The method of claim 13, further comprising:

reading, by each of the multiple data processing circuits, the candidate state value and input gate output from the one or more on-chip data buffer circuits;

calculating, by the data operation circuit, dot products between the candidate state value and the input gate output to generate a third partial sum; and adding, by the data operation circuit, the second partial sum to the third partial sum to generate the updated state cell.

15. The method of claim 14, further comprising:

determining, by the data dependency circuit, whether the output gate value and a tan h function of the updated state cell are calculated; and reading, by each of the multiple data processing circuits, the output gate value from the one or more on-chip data buffer circuits.

16. The method of claim 15, further comprising calculating, by the data operation circuit, the portion of the output value by calculate dot products between the output gate value and the tan h function of the updated state cell.

\* \* \* \* \*